(12) United States Patent
Svanebjerg

(10) Patent No.: US 7,850,120 B2
(45) Date of Patent: Dec. 14, 2010

(54) SPRAY-REGULATING SYSTEM INCORPORATED IN AIRCRAFT ANTI-ICERS

(75) Inventor: Elo Svanebjerg, Tappernøje (DK)

(73) Assignee: Vestergaard Company A/S, Roskilde (DK)

( * ) Notice: Subject to any disclaimer, the term of this patent is extended or adjusted under 35 U.S.C. 154(b) by 231 days.

(21) Appl. No.: 11/569,018

(22) PCT Filed: May 12, 2004

(86) PCT No.: PCT/IB2004/050657

§ 371 (c)(1),
(2), (4) Date: Nov. 13, 2006

(87) PCT Pub. No.: WO2005/110846

PCT Pub. Date: Nov. 24, 2005

(65) Prior Publication Data

US 2008/0017756 A1    Jan. 24, 2008

(51) Int. Cl.
*B64D 15/10* (2006.01)
*B64F 5/00* (2006.01)

(52) U.S. Cl. ............... 244/134 C; 244/134 R

(58) Field of Classification Search ........... 244/134 C, 244/134 R, 134 F; 239/67, 68, 74, 174, 329, 239/331, 332; 169/60, 61
See application file for complete search history.

(56) References Cited

U.S. PATENT DOCUMENTS

| | | |
|---|---|---|
| 3,243,123 A | 3/1966 | Olson et al. |
| 4,565,321 A | 1/1986 | Vestergaard |
| 4,848,657 A | 7/1989 | Hashimoto et al. |
| 4,986,497 A * | 1/1991 | Susko ............ 244/134 C |
| 5,028,017 A * | 7/1991 | Simmons et al. ..... 244/134 C |
| 5,318,254 A | 6/1994 | Shaw et al. |
| 5,711,483 A * | 1/1998 | Hays ................ 239/71 |
| 5,964,410 A * | 10/1999 | Brown et al. .......... 239/159 |
| 5,988,210 A * | 11/1999 | Komiya et al. ........ 137/487.5 |
| 6,032,874 A | 3/2000 | Vestergaard |

FOREIGN PATENT DOCUMENTS

| EP | 876842 A2 * | 11/1998 |
|---|---|---|
| EP | 1162372 A1 * | 12/2001 |

\* cited by examiner

*Primary Examiner*—Tien Dinh
*Assistant Examiner*—Richard R Green
(74) *Attorney, Agent, or Firm*—Stites & Harbison PLLC; Douglas E. Jackson

(57) ABSTRACT

The invention relates to de-icing and anti-icing procedures performed on airplanes on the ground, wherein a fluid is sprayed from the boom or arm of a de-icer installation onto the aircraft. A spray-regulating system is incorporated in aircraft anti-icers comprising a tank (1) with anti-icing fluid, a fluid pump (2) with a drive motor (6), and a hose or pipeline (7) between the pump (2) and a spray nozzle (3) located on an elevating boom, arm or operator's platform so that the fluid can be pumped from the tank (1) to the spray nozzle (3), said system further comprising a central control unit (5), a pressure-signal-generating pressure sensor (4) located proximate to the inlet of nozzle (3), and a regulating device (8) for the motor (6) to adjust the motor momentum, wherein a constant pressure upstream of the nozzle (3) and consequently over said nozzle (3) is maintained by said control unit (5) producing a signal calculated on a pressure signal received from the sensor (4) and the pressure required upstream of the nozzle (3), and said signal being transmitted to the regulating device (8), which then adjusts the momentum of the pump motor (6) and thereby adjusts the flow rate and or pressure rate in the pipeline (7).

6 Claims, 1 Drawing Sheet

SPRAY-REGULATING SYSTEM INCORPORATED IN AIRCRAFT ANTI-ICERS

FIELD OF THE INVENTION

Figure 1:
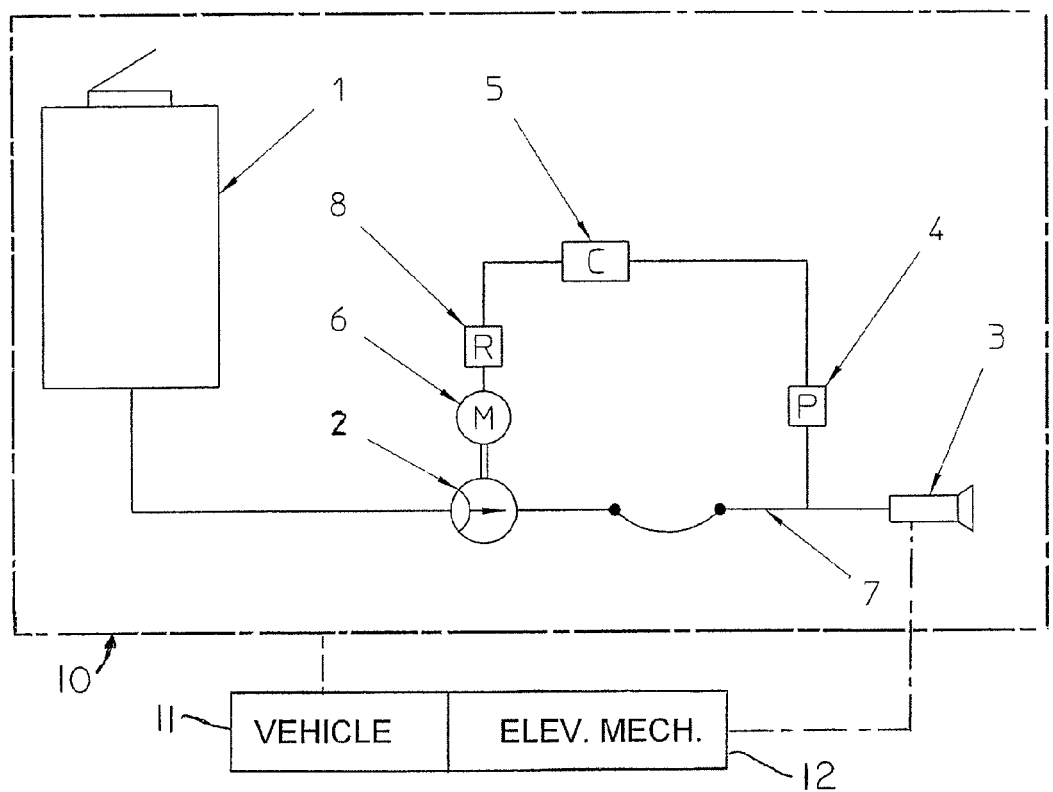

The present invention relates to de-icing and anti-icing procedures performed on airplanes on the ground, wherein a fluid is sprayed from the boom or arm of a de-icer installation onto the aircraft in order to remove or prevent frozen contaminations on the surface. Hereafter the expression de-icing means to remove snow and ice from the aircraft surface, the de-icing being performed by applying a heated low-viscosity fluid. The expression anti-icing is a treatment normally performed after de-icing; the fluid used for anti-icing is a thickened fluid with a higher viscosity. The purpose of the thickened anti-icing fluid is to adhere to the aircraft surface until the aircraft is airborne, to protect the aircraft against precipitation freezing on the surface.

BACKGROUND OF THE INVENTION

Such de-icing/anti-icing equipment is widely known from e.g. the patent literature and also from U.S. Pat. No. 4,565,321 "Vehicle for de-icing aircraft" belonging to the assignee of the present application.

The basic layout of the equipment comprises e.g. a vehicle frame or truck and a lever or boom extending from the vehicle and carrying an operator's platform from where the spraying onto an aircraft is provided.

In this technical field it is known to regulate the flow of liquid by regulating the pump motor and EP 0 876 842 B1 "Mixing apparatus for spraying a liquid mixture" also in the name of the present assignee describes the use of two tanks containing liquids to be mixed before spraying, wherein a motor-regulating system is provided for maintaining a required mixing ratio.

In general, such equipment will comprise a number of spraying components including tanks with de-icing and anti-icing fluid, fluid pumps with drive motors, and hoses or pipelines between the pumps and the spray nozzle to pump the fluid from the tank to the spray nozzle at the platform.

In prior art equipment it is common standard to maintain a constant flow rate when anti-icing fluid is sprayed, in order to achieve a constant pressure drop from the fluid pump to the fully opened nozzle, However, this results in too much fluid being used, because the flow from the nozzle cannot be adjusted according to the actual needs.

For anti-icing purposes the fluid will have added thickeners in order to hold a certain fluid-layer thickness on the aircraft surface for an extended period (holdover time) after application. The resulting increased viscosity makes the fluid sensitive to shearing damages, when higher pressure drops over the nozzle occur because the fluid will be accelerated very much and the molecular structure would be stretched beyond cohesion limits.

The occurrence of lower pressure drops over the nozzle would mean too short spray distance of the fluid jet to obtain a satisfactory distribution of fluid on the surface of the aircraft.

SUMMARY OF THE INVENTION

As opposed to the constant flow scenario the inventor has pursued establishing a constant pressure drop over the nozzle even if the flow rate through the pipeline is variable. Thereby it is possible to progressively match the pump pressure required to compensate for the differences in height of the nozzle relative to the pump and for the pressure drop derived from the variable flow in the pipeline.

According to the invention a pressure-regulating system is provided, which secures a constant pressure upstream of the nozzle and thereby a constant pressure drop over the spray nozzle irrespective of the height of the operator's platform relative to the pump, and of the pressure drop in the pipeline.

The pressure-regulating system comprises a pressure sensor mounted in close proximity to the nozzle and transmitting its measured data to a central control unit, which further instructs a regulator device to adjust the momentum of the fluid pump drive motor and thereby varying the flow rate and for pressure rate in the pipeline.

According to the invention it is possible to maintain a constant pressure on the upstream side of the nozzle and thereby a constant pressure drop over the nozzle with a variable fluid flow through the nozzle. The constant pressure will optimize the spray pattern without damaging the fluid. With a variable flow it is possible to adjust the amount of fluid sprayed to the amount needed for covering the surface of the aircraft.

According to a further embodiment of the invention the central control unit comprises a signal receiver and a signal transmitter and a computer to continuously calculate the proper motor-regulating signal based on the input data from the pressure sensor.

Moreover, the spray-regulating system according to the invention is further comprising a tank for water, and means for mixing the anti-icing fluid and water before it is pumped into the pipeline by means of the momentum-regulated drive motor driving one or more pumps for delivery of fluid into the pipeline.

Yet another embodiment of the invention comprises further sensors to measure parameters, e.g. the viscosity of the fluid based on mixture ratio and temperature, wherein such further parameter data are processed by the control unit together with the pressure signal, and the resulting signal is sent to the regulating device The spray-regulating system according to the invention can also be used for spraying equipment comprising several tanks and pumps working in parallel.

Finally, there is provided an anti-icer comprising a vehicle and an elevating boom, arm or platform with a spray-regulating system according to the invention.

BRIEF DESCRIPTION OF THE DRAWINGS

FIG. 1 is a diagram showing the spray-regulating system of the invention.

DETAILED DESCRIPTION OF THE PREFERRED EMBODIMENTS

Referring to FIG. 1 a spray-regulating system 10 provided on a vehicle 11 according to the invention is illustrated. The system comprises a tank 1 containing anti-icing fluid and being connected to a fluid-diaphragm pump 2 driven by a motor 6. From said pump 2 anti-icing fluid is pumped through a hose or pipeline 7 to the spray nozzle 3 located on an elevation mechanism 12 so that it is sprayed onto the surfaces of an aircraft and protects them from building up frozen contaminations on the surface.

In close proximity to the inlet of the spray nozzle 3, a pressure sensor 4 is mounted in such a way that the inlet pressure is measured and reported to a central control unit 5. Said control unit 5 receives the pressure signal from the sensor 4 and based on the possible difference between the actual pressure and the required pressure a signal is produced and transmitted to a regulating device 8, which will then adjust the speed of the pump motor 6 and thereby influence the fluid flow rate in the pipeline 7.

In this way it is possible to adjust for pressure drops in the hose or pipeline 7 when the flow rate is variable and for the pressure loss in accordance with the height of the spray nozzle relative to the height of the pump, which ensures a constant pressure upstream of the nozzle and thereby a constant pressure drop over the nozzle, so that the spray pattern is optimized without damage to the thickened anti-icing fluid.

Obviously, the control parameters being used to calculate the signal transmitted by the central control unit 5 can take into account measures of not only the pressure but also the viscosity of the fluid in dependence on the mixture ratio and temperature.

The invention claimed is:

1. Spray-regulating system for an aircraft anti-icer comprising:
    a tank with anti-icing fluid,
    a fluid pump which is driven by a drive motor and which is fluidly connected to the fluid in the tank so that the fluid is pumped from the tank by said fluid pump,
    a hose or pipeline between the fluid pump and a spray nozzle so that the fluid is pumped from the tank to the spray nozzle by the fluid pump,
    a pressure-signal-generating pressure sensor which is mounted in close proximity to the spray nozzle and which generates a pressure signal,
    a control unit which produces a control signal calculated on the pressure signal received from the pressure sensor and the pressure required upstream of the nozzle, and
    a regulating device for the drive motor which receives the control signal produced by the control unit, which adjusts the momentum of the drive motor in accordance with the control signal, which thereby adjusts at least one of the flow rate or the pressure rate in the hose or pipeline, and which thereby maintains a constant pressure of the fluid in close proximity to the nozzle and a substantially constant pressure drop of the fluid over the spray nozzle irrespective of differences in height of the nozzle relative to the pump.

2. Spray-regulating system according to claim 1, wherein the control unit is comprised of a signal receiver, a signal transmitter, and a computer to continuously calculate a proper motor-regulating signal based on the pressure signal from the pressure sensor.

3. Spray-regulating system according to claim 1, wherein at least one further parameter is processed by the control unit together with the pressure signal to produce a resulting control signal, and the resulting control signal is received by the regulating device.

4. Spray-regulating system according to claim 3, wherein the at least one further parameter is viscosity of the fluid based on a mixture ratio and a temperature of the fluid.

5. Anti-icer comprising a vehicle, an elevating mechanism, and a spray-regulating system according to claim 1.

6. Spray-regulating system according to claim 1, wherein the constant pressure is secured substantially directly at the nozzle.

* * * * *